April 11, 1933.  N. D. LEVIN  1,903,702
ELECTRICAL CONTROL SYSTEM FOR MINING MACHINERY
Filed Dec. 3, 1929
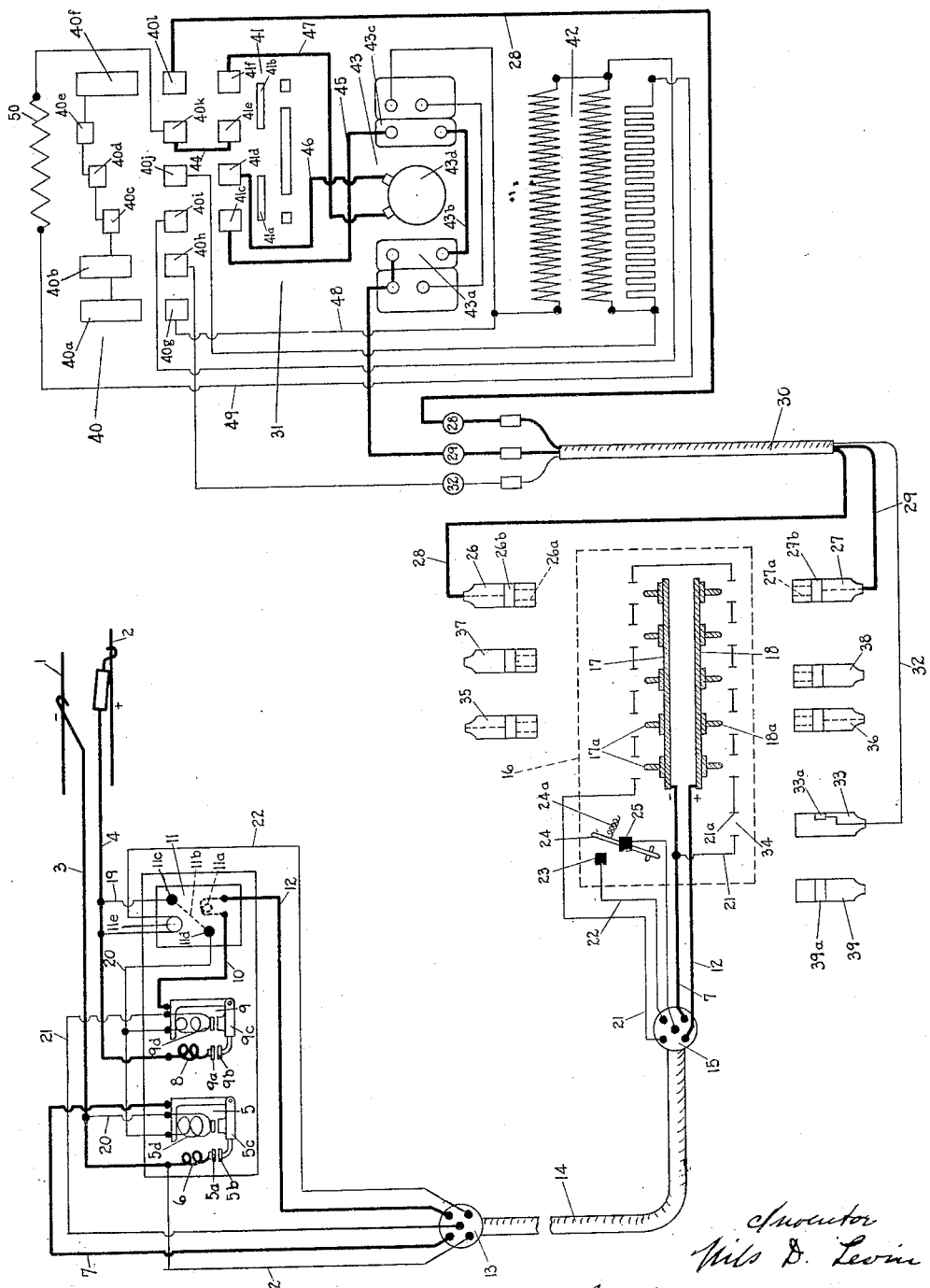

Patented Apr. 11, 1933

1,903,702

UNITED STATES PATENT OFFICE

NILS D. LEVIN, OF COLUMBUS, OHIO, ASSIGNOR TO THE JEFFREY MANUFACTURING COMPANY, OF COLUMBUS, OHIO, A CORPORATION OF OHIO

ELECTRICAL CONTROL SYSTEM FOR MINING MACHINERY

Application filed December 3, 1929. Serial No. 411,334.

The present invention relates to electrical equipment for mining machines and the like, and has particular reference to a safety installation whereby current may be supplied to one or several electrically driven appliances in the mine through a single safety control appliance.

In conducting mining operations in a mine room worked on the short wall system, it is customary to transport the short wall machine into the room on a truck travelling over tracks laid into the room. The truck is ordinarily motor driven and is supplied with electricity through a double conductor cable mounted on a reel, the ends of the cable being respectively connected to the main supply conductors at the room entry. Upon arrival in the room, the mining machine is unloaded from the truck, the latter then serving as a base in the vicinity of which the machine may be maneuvered, a flexible conductor cable in connection with the reel cable leading from the truck to the mining machine for the supply of current to the motor of the latter.

According to the present invention, I mount on the truck main line switches in both sides of the line, the switch in the positive side of the line being closed upon initial operation of a controller located on the mining machine, and further I provide in the conductor cable between the truck and machine, a novel form of junction box into which other motor driven appliances may be connected. If the mining machine is not to be operated, but some other instrumentality, such as a conveyor, which does not involve a controller, is to be used, I provide means whereby the circuit for closing the positive switch may be completed at at the junction box.

The two line switches are furthermore, according to my invention, under the control of an overload relay provided with a reset device actuated by a switch located at the junction box.

Inasmuch as the junction box is adapted to supply current to a number of instrumentalities, it includes a number of sockets adapted to be plugged into. To avoid the danger of short circuits at the junction box when not all of its sockets are plugged into, I provide dummy plugs which must be inserted in the vacant sockets before any current can pass through the junction box.

Since the objects and advantages of the present invention will be obvious from a description of an embodiment thereof, I shall proceed to describe it, without further reference to its general aspects, in connection with the specific embodiment shown in the accompanying drawing which illustrates a typical installation.

Referring to the drawing, reference numeral 1 designates a grounded negative main line conductor, and 2 the positive main line conductor. The negative conductor will ordinarily be a track rail, and the positive conductor an overhead trolley wire. The reel cable comprises conductors 3 and 4, the former being engaged with the track rail and the latter with the overhead conductor at the room entry in the well understood manner. Conductor 3 is connected to a fixed contact $5^a$ of an electro-magnetic switch 5 through a blow-out coil 6. The switch 5 includes a movable contact $5^b$ carried on a swingable armature arm $5^c$ adapted to be moved upon energization of a magnet coil $5^d$ to move contact $5^b$ against contact $5^a$ to complete a circuit from conductor 3 to a conductor 7.

Conductor 4 is connected through a blowout coil 8 to a fixed contact $9^a$ of an electromagnetic switch 9, the latter including a swingable armature arm $9^c$ carrying a contact $9^b$, and moved upon energization of the magnet coil $9^d$ to engage contacts $9^a$ and $9^b$ and thereby complete a circuit from conductor 4 to a conductor 10. Conductor 10 is in connection through a coil $11^a$ of an overload relay 11 with a conductor 12.

Conductors 7 and 12 lead to a terminal box 13 at one end of a flexible cable housing 14 and through the latter to a terminal box 15 at the other end thereof, whence they are led into a junction box 16 and respectively connected to negative and positive bus bars 17 and 18 therein.

The overload relay 11 includes a movable arm 11$^b$ adapted to connect contacts 11$^c$ and 11$^d$, this arm being movable under the influence of coil 11$^a$ to break circuit between the contacts upon overload in the line. The arm 11$^b$ is adapted to be reset by means of a reset magnet 11$^e$.

Contact 11$^c$ of the overload relay is in connection with conductor 4 through a conductor 19, and contact 11$^d$ is in connection with conductor 3 through a conductor 20 in which is interposed coil 5$^d$ of switch 5. A conductor 21 is connected into conductor 20, and has interposed therein coil 9$^d$ of switch 9. The other end of conductor 21 is passed through cable housing 14 to the junction box 15.

A conductor 22 leads from conductor 3 at switch 5 through housing 14 to a contact point 23 at junction box 16. A switch arm 24 is adapted upon movement to connect contact 23 with contact 25 to complete the connection of line 22 to conductor 4 through the coil of reset magnet 11$^e$.

Each of bus bars 17 and 18 is provided with a plurality of contact tips 17$^a$ and 18$^a$. Conductor 21 is led around the bus bars and, in front of each tip 17$^a$ or 18$^a$, is provided with a gap in the nature of a socket adapted to be engaged by plugs 26 and 27 which form the terminals of main line conductors 28 and 29 passing through a flexible housing 30 to the mining machine designated as a whole at 31.

Plug 26 comprises an insulating body longitudinally of which conductor 28 is passed to a connecter socket 26$^a$ adapted to engage over a tip 17$^a$ of bus bar 17 to connect conductors 7 and 28. The insulating body of the plug is surrounded, as here shown, by a conductor strip 26$^b$ which, when the plug is engaged with the bus bar, is so positioned as to bridge a gap in line 21. Plug 27 is similarly provided with a connecter socket 27$^a$ and a conductor strip 27$^b$, which latter is adapted to bridge a further gap in line 21 when plug 27 is engaged with bus bar 18.

It will be seen that in order to energize coil 9$^d$ of positive switch 9, a circuit must be completed through conductor 21 to the negative side of the line. As will be described, the completion of this circuit is accomplished by a controller located on the mining machine, the completed circuit including a conductor 32 led through housing 30 and having at its end a plug 33 adapted to be inserted in a gap 34 of circuit 21. Plug 33 is preferably of a shape such as to prevent its insertion in any of the gaps in line 21 opposite tips 17$^a$ or 18$^a$, and includes an insulating body having a localized lateral contact 33$^a$ to which conductor 32 is connected. Plug 33 is insertable in gap 34 so as to bring contact 33$^a$ into engagement with terminal 21$^a$ of line 21.

I have shown each of bus bars 17 and 18 as provided with five connector tips, and line 21 as having a gap opposite each of these tips. It is obvious that plugs 26 and 27 will bridge only two of these gaps so that no circuit will be completed up to contact 33$^a$ of plug 33. The remaining gaps, however, are adapted to be bridged as by plugs such as 35 and 36 in connection with the conductors of other electrically operated mining machinery, or by dummy plugs such as 37 and 38 provided merely with contact strips for the purpose of bridging all open gaps in line 21.

In case no machine is to be used involving a controller, and hence conductor 32, I provide a further dummy plug 39 having a full conductor strip 39$^a$ adapted to bridge gap 34 so as to connect conductor 21 to conductor 7 at the junction box, thus completing the circuit through coil 9$^d$.

On the mining machine 31, there is arranged a controller, including a commutating cylinder 40, a reverse drum 41 and a resistance 42 for the control of a motor 43. The cylinder 40 of the controller has spaced thereon two similar segments 40$^a$ and 40$^f$ engageable upon movement of the controller cylinder to its first position with fixed fingers 40$^g$ and 40$^l$. In the second position of the cylinder, a segment 40$^b$ is engaged with a finger 40$^h$, while in the third, fourth and fifth positions of the cylinder, segments 40$^c$, 40$^d$ and 40$^e$ are successively engaged with fingers 40$^i$, 40$^j$ and 40$^k$ to cut out successive sections of resistance 42. It will be noted that all the segments of the commutator are in electrical connection with each other.

The reverse drum has arranged thereon, so far as is of interest as regards a circuit illustrative of the present invention, a pair of bridging plates 41$^a$ and 41$^b$ adapted to bridge fixed fingers 41$^c$, 41$^d$, 41$^e$ and 41$^f$, respectively. Finger 41$^e$ is connected with finger 40$^k$ by means of a conductor 44.

Conductor 29 is in connection with one field winding 43$^a$ of motor 43 and through a conductor 43$^b$ with the other field winding 43$^c$, and thence through a conductor 45 with finger 41$^c$. Finger 41$^d$ is in connection through a conductor 46 with a brush cooperating with the motor armature 43$^d$, while the other brush is in connection with finger 41$^f$ through a conductor 47. Finger 40$^g$ is connected to resistance 42 by means of a conductor 48, the other end of the resistance being in connection with finger 40$^k$ through a conductor 49, the latter having a blow-out coil 50 interposed therein. Conductor 28 is in connection with fingers 40$^l$, while conductor 32 is in connection with finger 40$^h$.

In describing the operation of the described apparatus, it will be assumed that switch arm 11$^b$ of the overload relay is in disconnecting position as regards contacts 11$^c$ and 11$^d$, that plugs 26 and 27 are respectively engaged with a tip 17ª and 18ª, that plug 33 is inserted in gap or socket 34, and that the remaining gaps in circuit 21 are bridged by means of the conductor strips of a suitable number of dummy plugs as 37 or 38. Switch arm 24 will now be moved to connect contacts 23 and 25, thereby completing circuit 22 through reset coil 11ᵉ, thus bringing switch arm 11ᵇ across the contacts 11ᶜ and 11ᵈ. Switch arm 24 is manually operated and upon release will be brought to inoperative position by means of a spring 24ª. The resetting of the overload relay connects conductors 19 and 20 across the line, thereby energizing coil 5ᵈ of switch 5, and bringing contact 5ᵇ against contact 5ª to connect conductors 3 and 7. Switch 9 remains open.

Upon moving the cylinder of controller 40 to its first position, segments 40ª and 40ᶠ will engage fingers 40ᵍ and 40ˡ, respectively, and it will be assumed that the reverse drum has been moved to bring bridging plates 41ª and 41ᵇ into operative relation with fingers 41ᶜ, 41ᵈ and 41ᵉ, 41ᶠ, respectively. Conductor 7 is now in connection with conductor 28 through bus bar 17, and conductor 28 through finger 40ˡ, segment 40ᶠ, segment 40ª, finger 40ᵍ, conductor 48, resistance 42, conductor 49, blow-out coil 50, finger 40ᵏ, conductor 44, finger 41ᵉ, plate 41ᵇ, finger 41ᶠ, conductor 47, commutator 43ᵈ, conductor 46, finger 41ᵈ, plate 41ª, finger 41ᶜ, conductor 45, field coil 43ᶜ, conductor 43ᵇ, field coil 43ª, conductor 29, bus bar 18, conductor 12, coil 11ª, and conductor 10, is in connection with the contact 9ᵇ of switch 9. Upon the movement of the commutating cylinder to its second position, segment 40ᵇ is engaged with finger 40ʰ, thereby connecting conductor 32 which is in connection with the negative side of the line and conductor 21 which is in connection with the positive side of the line, thereby closing switch 9 on the positive side of the line and initiating rotation of motor 43. Further movements of the commutating cylinder serve to successively cut out sections of resistance 42 in the well known manner. Upon reverse rotation of the commutating cylinder, switch 9 will be opened as soon as segment 40ᵇ leaves finger 40ʰ, and the positive side of the line will thus be broken. Under these conditions, only the negative side of the line is in connection with the controller, so that there will be no difference of potential between the fingers and its grounded casing, thus avoiding all danger of short circuiting. Upon the occurrence of an overload, switch arm 11ᵇ is moved to off-position, so that the coils of both switches 5 and 9 are de-energized, and the switches thus opened.

If apparatus not involving a controller is to be operated, plugs such as 35 and 36 will be engaged with tips 17ª and 18ª, plug 39 will be engaged in gap 34, and the remaining gaps in conductor 21 will be bridged by means of dummy plugs, such as 37 and 38. Upon throwing in switch arm 24, switches 5 and 9 will be simultaneously closed. If desired, however, switch arm 24 may be moved to close negative switch 5, and then plug 39 inserted to complete circuit 21 and close switch 9.

It will be understood that the described embodiment of my invention is illustrative only, and that my invention includes all arrangements falling within the terms of the following claims.

I claim:

1. In apparatus of the class described, a junction box comprising a pair of bus bars, plugs engageable with said bars; each of said plugs comprising a body of insulating material, a conductor extending longitudinally of the body for connection with a bar, and a conductive strip extending between external points of the body and insulated thereby from the conductor; a second conductor having a plurality of gaps therein bridged by the conductive strips when the plugs are engaged with the bars, and dummy plugs each comprising an insulating body and a conductive strip extending between external points of the body, said dummy plugs being disposable in any of said second conductor gaps not filled by the first-described plugs to bridge such gaps by means of their conductive strips.

2. In apparatus of the class described, a junction box comprising a pair of bus bars, plugs engageable with said bars; each of said plugs comprising a body of insulating material, a conductor extending longitudinally of the body for connection with a bar, and a conductive band encircling said body and insulated thereby from the said conductor; a second conductor having a plurality of gaps therein bridged by the conductive strips when the plugs are engaged with the bars, and dummy plugs each comprising an insulating body and a conductive band encircling the body, said dummy plugs being disposable in any of said second conductor gaps not filled by the first-described plugs to bridge such gaps by means of their conductive bands.

3. In apparatus of the class described, a pair of bus bars in the junction box, a line conductor in connection with each of said bars, a conductor extending around said bars and having gaps therein, and plugs engageable with the bars and adapted to bridge said gaps to complete said conductor up to one of the line conductors at the junction box.

4. In apparatus of the class described, a junction box comprising a pair of bus bars, contacts carried by said bars, plugs engageable with said contacts, line conductors in connection with said bars, a conductor other than the line conductor having gaps therein, and means carried by said plugs to bridge said gaps only when the plugs are engaged with said contacts.

5. In apparatus of the class described, a junction box comprising a pair of bus bars, a plurality of plugs engageable with each of said bars, line conductors in connection with said bars, a conductor other than the line conductors having gaps therein, and means carried by said plugs to bridge said gaps.

In testimony whereof I have hereunto set my hand.

NILS D. LEVIN.